(12) United States Patent
Yun

(10) Patent No.: US 11,192,431 B2
(45) Date of Patent: Dec. 7, 2021

(54) STRUCTURE FOR PROVIDING SEPARATION STRENGTH OF OPPOSED SLIDING DOOR

(71) Applicants: Hyundai Motor Company, Seoul (KR); Kia Motors Corporation, Seoul (KR)

(72) Inventor: Hyung-In Yun, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 255 days.

(21) Appl. No.: 16/594,366

(22) Filed: Oct. 7, 2019

(65) Prior Publication Data
US 2020/0398650 A1 Dec. 24, 2020

(30) Foreign Application Priority Data

Jun. 18, 2019 (KR) .......................... 10-2019-0072535

(51) Int. Cl.
*B60J 5/04* (2006.01)
*B60J 5/06* (2006.01)
*E05D 15/10* (2006.01)

(52) U.S. Cl.
CPC ................. *B60J 5/047* (2013.01); *B60J 5/06* (2013.01); *E05D 15/101* (2013.01); *E05D 2015/1026* (2013.01); *E05Y 2900/531* (2013.01)

(58) Field of Classification Search
CPC ... B60J 5/041; B60J 5/06; B60J 5/0479; B60J 5/0477; E05D 15/101; E05D 2015/1026; E05D 15/1047; E05Y 2900/531; E05Y 2201/684; E05Y 2201/708; E05Y 2900/532; E05F 5/06
USPC ........................................................ 296/155
See application file for complete search history.

(56) References Cited

U.S. PATENT DOCUMENTS

| | | | | |
|---|---|---|---|---|
| 5,896,704 A | * | 4/1999 | Neag | .................... E05D 15/1081 49/209 |
| 8,919,860 B2 | * | 12/2014 | Thiele | ........................ B60J 5/06 296/155 |
| 2009/0212592 A1 | * | 8/2009 | Takahashi | .................. B60J 5/06 296/155 |
| 2015/0291014 A1 | | 10/2015 | Choi | |
| 2018/0347253 A1 | * | 12/2018 | Gokan | .................. E05F 15/643 |

FOREIGN PATENT DOCUMENTS

KR            101601106 B1     3/2016

* cited by examiner

*Primary Examiner* — Pinel E Romain
(74) *Attorney, Agent, or Firm* — Slater Matsil, LLP

(57) ABSTRACT

A structure can provide separation strength of an opposed sliding door. The structure includes a rail configured to be mounted to a vehicle body in a longitudinal direction thereof, a first bracket configured to be fixedly connected to the vehicle body at a first side of the rail and having a hook receiver, a slider inserted into the rail and coupled thereto, a swing arm configured rotatably connected to a sliding door and to the slider, and a second bracket fixedly connected to the swing arm. The second bracket has on a first side thereof a hook to be received in the hook receiver. The hook is received in the hook receiver when a load is applied to the sliding door in a direction from an inside to an outside of the vehicle body with the sliding door being closed.

18 Claims, 7 Drawing Sheets

STRUCTURE FOR PROVIDING SEPARATION STRENGTH OF OPPOSED SLIDING DOOR

CROSS-REFERENCE TO RELATED APPLICATIONS

This application claims priority to Korean Patent Application No. 10-2019-0372535, filed in the Korean Intellectual Property Office on Jun. 18, 2019, which application is hereby incorporated herein by reference.

TECHNICAL FIELD

The present invention relates to a structure for improving the separation strength of an opposed sliding door.

BACKGROUND

Generally, a vehicle has a vehicle compartment of a predetermined size to accommodate a driver or a passenger. A compartment door is mounted to a vehicle body to open or close the vehicle compartment.

A sliding type compartment door is provided with a front sliding door that is installed at a front position in a longitudinal direction of the vehicle, and a rear sliding door that is installed at a rear position in the longitudinal direction of the vehicle. The front sliding door and the rear sliding door are generally installed to be moved by the movement of a slider and a swing arm, which are connected to a lower rail and a center rail mounted on the vehicle body or the door.

Recently, a B pillarless door is used to expand the open space of the vehicle compartment by removing a B pillar and thereby make it easy to load and to get on or off the vehicle in a narrow space.

Generally, the B pillar is installed so as to protect a passenger's safety in consideration of rigidity against the broadside collision of the vehicle. Hence, in order to manufacture the B pillarless door, a certain standard, such as the protection of the sliding door from impacts acting on the side surface of the vehicle, should be satisfied.

Particularly, the vehicle equipped with the sliding door should satisfy a legal standard to prevent the sliding door from being opened even under a certain load that is applied from the inside to the outside of the vehicle in a state where the sliding door is closed. A test satisfying the legal standard is referred to as a test on the separation strength of the opposed sliding door.

In this connection, referring to FIG. 1, according to the related art, when a load F is applied with a front sliding door boa and a rear sliding door bob being closed in the test on the separation strength of the opposed sliding door, a swing arm 40 may be rotated and thereby a sliding door 10 may be undesirably opened if there is weak or no in fastening force between the sliding door 10 and a vehicle body P or between sliding doors 10.

As the related art for locking the sliding door, Korean Patent No. 10-1601106 entitled "Sliding-door locking device of vehicle" has been proposed, in which a sliding door is locked by locking or unlocking a latch to or from a locking groove formed in a rail, by the operation of the swing arm that is rotatably fastened to a connecting structure. However, Korean Patent No. 10-1601106 has a complex configuration to secure or release the sliding door to or from the vehicle.

SUMMARY

The present invention relates to a structure for improving the separation strength of an opposed sliding door. Particular embodiments of the invention relate to an improved structure, capable of satisfying a standard that the sliding door can withstand, when testing the separation strength of the sliding door by applying a load while the opposed sliding door is closed.

Accordingly, the present invention has been made keeping in mind the above problems occurring in the related art, and is intended to provide a novel structure, which keeps a sliding door closed even under a load that is applied in a test on the separation strength of an opposed sliding door, by applying a structure for improving the separation strength of a sliding door to a lower side of a vehicle through a simple configuration, thus satisfying the above-described legal standard.

Embodiments of the present invention provide a structure for improving separation strength of an opposed sliding door. The structure includes a rail mounted to a vehicle body in a longitudinal direction thereof. A first bracket is fixedly connected to a vehicle body at a first side of the rail and has a hook receiver. A slider is inserted into the rail and coupled thereto to be movable in a rolling manner. A swing arm is rotatably connected to a sliding door, and rotatably connected to the slider. A second bracket is fixedly connected to the swing arm and has on a first side thereof a hook to be received in the hook receiver.

Here, if a load is applied to the sliding door in a direction from an inside to an outside of the vehicle body with the sliding door being closed, the hook is received in the hook receiver.

The hook may be formed on a first side of the first bracket to be inclined. The hook may include a horizontal part extending from the second bracket, and a vertical part extending vertically from an end of the horizontal part.

If the load is applied with the hook being received in the hook receiver, a first side of the hook may come into contact with a sidewall of the hook receiver to prevent the swing arm from being rotated.

The structure may further include a stopper fixedly connected to the vehicle body to limit a movement of the swing arm between the rail and the first bracket.

Here, an inwardly depressed female part may be formed on the stopper, and a male part may be formed on a second side of the second bracket to be inserted into the female part.

The female part may be obliquely formed on the second side of the second bracket, and the male part may be obliquely formed to correspond to the female part.

The female part may be a slot-shaped groove extending in a vertical direction of the vehicle body.

A bumper may be provided between the male part and the second side of the second bracket to allow the swing arm to mitigate shocks acting on the stopper.

The present invention has an advantage in that a first bracket and a second bracket applied to a structure for improving the separation strength of an opposed sliding door are not exposed to an outside of a side outer, thus providing an excellent appearance.

Furthermore, the present invention has an advantage in that a female part is shaped such that a vertical length thereof is larger than a horizontal length thereof, thus preventing the sliding door from being undesirably moved in a state where a male part is inserted into the female part, and providing an available space to allow a hook to be received in a hook receiver.

Furthermore, the present invention has an advantage in that the hook is received in and caught by the hook receiver, thus improving the separation strength of the opposed sliding door.

Furthermore, the present invention has an advantage in that the hook is received in the hook receiver and simultaneously the male part comes into contact with one side of the female part to support a load, thus further improving the separation strength of the opposed sliding door.

BRIEF DESCRIPTION OF THE DRAWINGS

The accompanying drawings are intended to illustrate the preferred embodiments of the invention, and aid in understanding the technical spirit of the invention when reading the following description. It is to be interpreted that the invention is not limited to embodiments shown in the drawings.

DETAILED DESCRIPTION OF ILLUSTRATIVE EMBODIMENTS

Hereinafter, a structure for improving the separation strength of an opposed sliding door according to preferred embodiments of the present invention will be described in detail with reference to the accompanying drawings. The terms or words used below should not be construed as being limited to the ordinary or dictionary meanings, and should be interpreted as meanings and concepts corresponding to the technical idea of the present invention on the basis of a principle wherein inventor(s) can properly define the concept of the terms in order to explain the invention in the best way.

A structure 100 for improving the separation strength of an opposed sliding door according to an embodiment of the present invention is intended to satisfy the requirements of the separation-strength regulations applied to the sliding door. According to the regulations, even if a certain load F is applied to the door while the sliding door 10 is closed, the sliding door 10 should maintain a closed state.

Meanwhile, the load F described herein means a load F that acts on the sliding door 10 in a direction from the inside to the outside of a vehicle body P.

Figure 3:
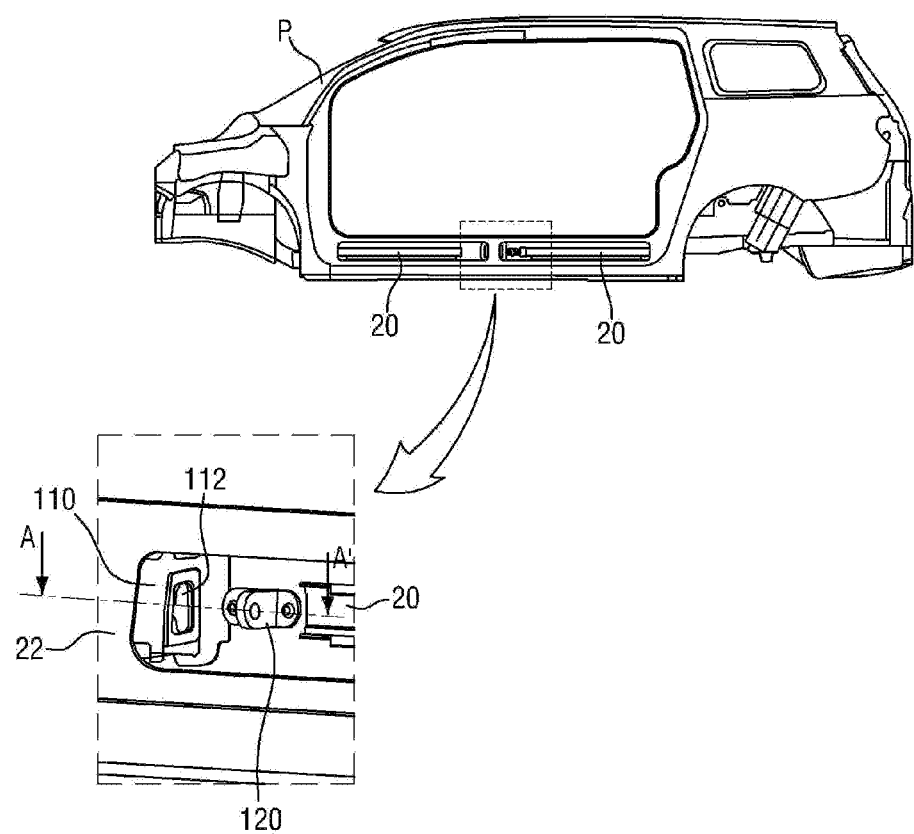
FIG. 3 is a view illustrating a configuration connected to a vehicle body in the structure for improving the separation strength of the door according to the embodiment of the present invention.
Figure 4:
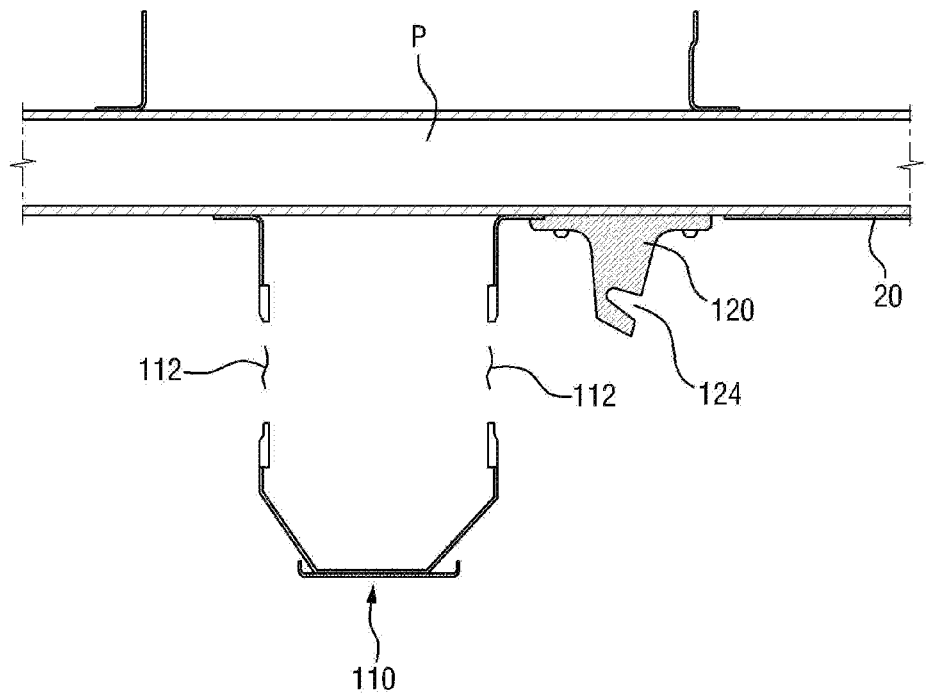
FIG. 4 is a sectional view taken along line A-A' of FIG. 3.
Figure 5:
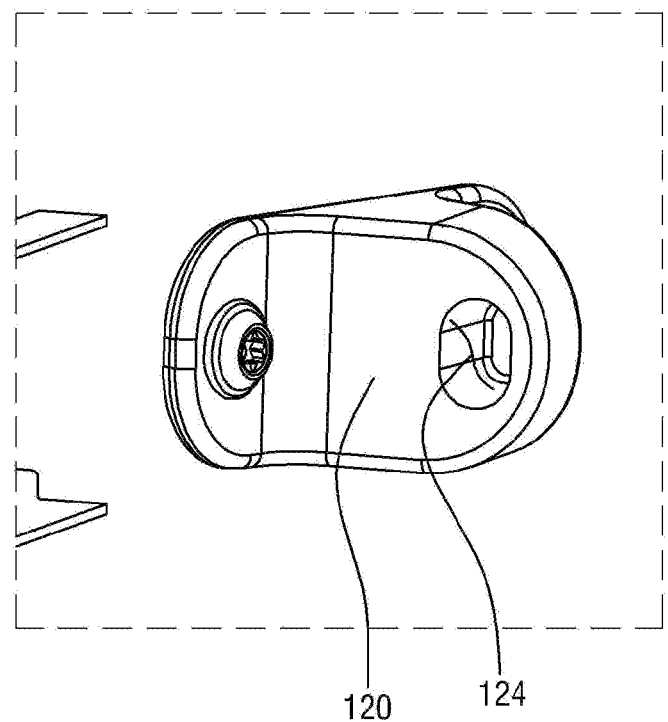
FIG. 5 is a view illustrating a stopper according to the embodiment of the present invention.
Figure 6A:
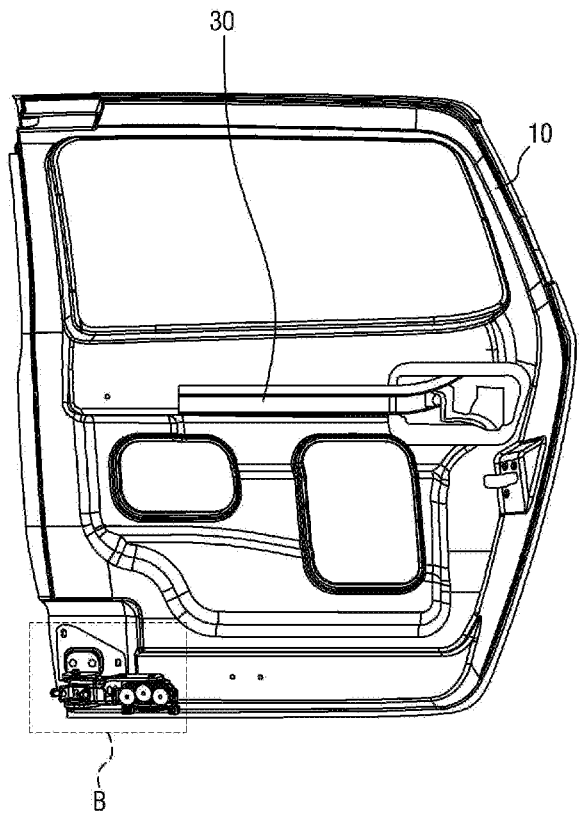
FIG. 6A is a view illustrating a configuration connected to a sliding door in the structure for improving the separation strength of the door according to the embodiment of the present invention.
Figure 6B:
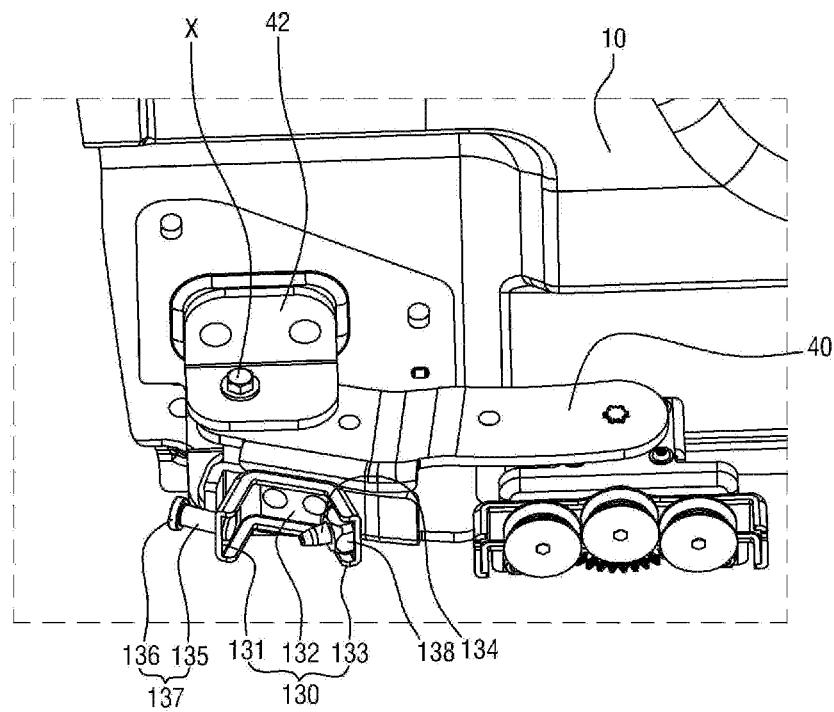
FIG. 6B is an enlarged view of portion B of FIG. 6A.

According to an embodiment of the present invention, the vehicle has only a center rail 30 (rail formed on a central portion of the vehicle) and a lower rail 20 (rail formed on a lower portion of the vehicle), and has no upper rail (rail formed on an upper portion of the vehicle). Here, the center rail 2 is formed on the sliding door 10, and the lower rail 5 is formed on the vehicle body P. Hereinafter, the structure 100 for improving the separation strength of the opposed sliding door according to the embodiment of the present invention will be described FIG. 2A is a view illustrating a state in which the structure for improving the separation strength of the opposed sliding door according to the embodiment of the present invention is applied to the vehicle body and the door, FIG. 2B is an enlarged view illustrating the structure for improving the separation strength of the door of FIG. 2A, FIG. 3 is a view illustrating a configuration connected to the vehicle body in the structure for improving the separation strength of the door according to the embodiment of the present invention, FIG. 4 is a sectional view taken along line A-A' of FIG. 3, FIG. 5 is a view illustrating a stopper according to the embodiment of the present invention, FIG. 6A is a view illustrating a configuration connected to the sliding door in the structure for improving the separation strength of the door according to the embodiment of the present invention, and FIG. 6B is an enlarged view of portion B of FIG. 6A.

Figure 1:
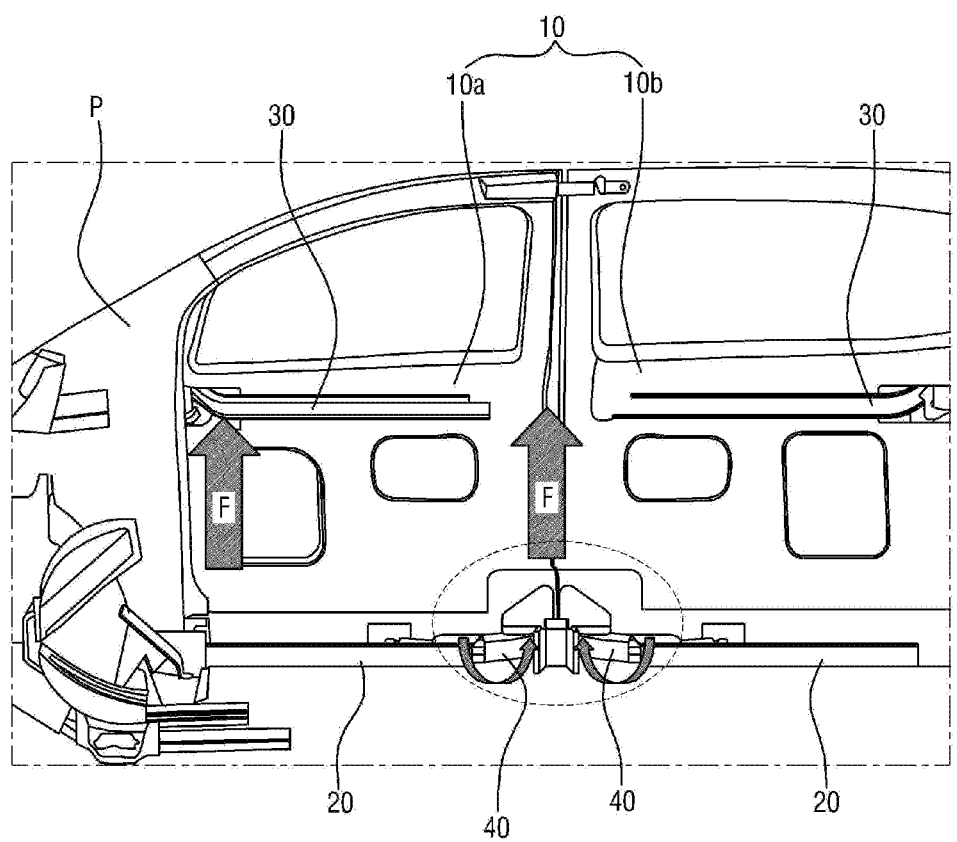
FIG. 1 is a view illustrating a load acting on a sliding door and the rotation of a swing arm by the load in testing separation strength according to the related art.
Figure 2A:
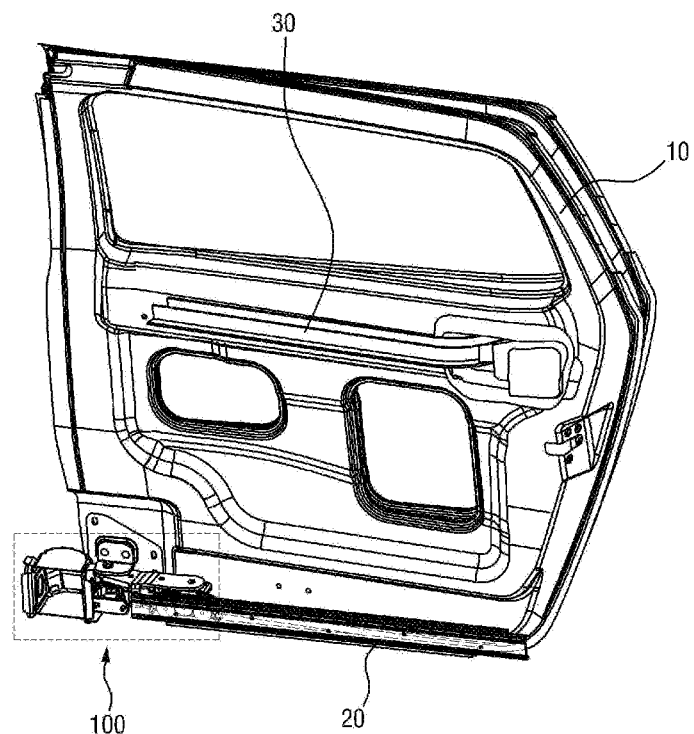
FIG. 2A is a view illustrating a state in which a structure for improving the separation strength of an opposed sliding door according to an embodiment of the present invention is applied to a vehicle body and a door.
Figure 2B:
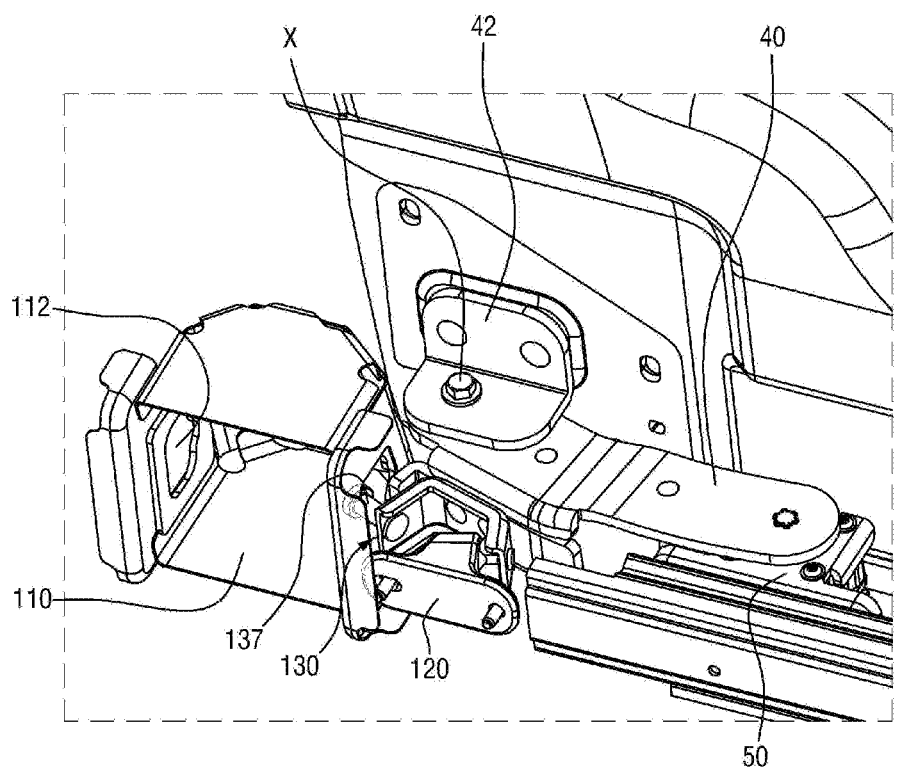
FIG. 2B is an enlarged view illustrating the structure for improving the separation strength of the opposed sliding door of FIG. 2A.

Referring to FIGS. 2A and 2B, the structure boo for improving the separation strength of the opposed sliding door according to the embodiment of the present invention is provided on lower portions of the vehicle body P and the sliding door 10, and includes a first bracket 110, a stopper 120, a swing arm 40, and a second bracket 130.

Here, the lower rail 20 is formed on the lower portion of the vehicle body P in a longitudinal direction of the vehicle body P. One end of the slider 50 is inserted into the lower rail 20 to be coupled in a rolling manner. The slider 50 is guided by the lower rail 20 to move in the longitudinal direction of the vehicle body P.

Meanwhile, the structure boo for improving the separation strength of the opposed sliding door according to the embodiment of the present invention may be applied to both a front sliding door boa and a rear sliding door bob. However, for the convenience of understanding, a state where this structure is applied to one sliding door 10 will be described herein.

The first bracket 110 is secured to the vehicle body P to be located at one side of the lower rail 20. More precisely, in the state where the front sliding door boa and the rear sliding door bob are closed, the first bracket 110 is located at a middle point between two slide doors 10. As illustrated in FIG. 3, the first bracket 110 is located inside a side outer 22, and the position of the first bracket 110 is checked through an opening of the side outer 22. Therefore, in the state where the sliding door 10 is mounted on the vehicle body P, the first bracket 110 is not exposed to the outside.

Hole-in-hook receivers 112 are formed on both sides of the first bracket 110 so that a hook 137 that will be described later passes through the receivers. As described above, since the structure boo for improving the separation strength of the opposed sliding door according to the embodiment of the present invention is applied to both the front sliding door boa and the rear sliding door bob, the hook receivers 112 are formed on both sides of the first bracket 110.

If the hook receiver 112 has a rectangular shape, the hook receiver 112 is composed of four walls, for example, an upper wall, a lower wall, a left wall, and a right wall. Since the hook receiver 112 may have various shapes, various numbers of walls may be provided accordingly.

The stopper 120 serves to limit the movement of the swing arm 40 that will be described later, and is secured to the vehicle body P to be located between the lower rail 20 and the first bracket 110. Although the stopper 120 according to the embodiment of the present invention is made of an elastic material to absorb shocks, the stopper 120 is not limited to this material.

A female pall 124 that is an inwardly depressed slot-shaped groove is formed in the stopper 120. The female pall 124 according to the embodiment of the present invention is formed to be downwardly inclined towards the inside. As illustrated in FIG. 5, the female part 124 is formed such that a vertical length is larger than a horizontal length. However, the shape and inclination of the female part 124 may be set in various ways, as long as a male part 134 that will be described later is inserted into the female part.

Referring to FIGS. 3 and 4, in the structure 100 for improving the separation strength of the sliding door according to the embodiment of the present invention, the first bracket 110, the stopper 120, and the lower rail 20 are secured to the vehicle body P to be placed on the same straight path. Here, the hook receiver 112 and the female part 124 are formed to face the lower rail 20.

One end of the swing arm 40 is rotatably coupled to a mounting bracket 42 that is fixedly mounted on the inside of the sliding door 10, while the other end is rotatably coupled to the slider 50. Therefore, if the sliding door 10 moves, the swing arm 40 may rotate about a rotating shaft X, and may move linearly along the lower rail 20.

The second bracket 130 has a connecting part 132 that is fixedly connected to one side surface of the swing arm 40, one side 131 that faces the hook receiver 112 of the first bracket 110, and the other side 133 that faces the female part 124 of the stopper 120. According to an embodiment of the present invention, one side 131 of the second bracket 130 is formed to be approximately perpendicular to the connecting part 132, and the other side 133 is formed to be inclined relative to the connecting part 132. However, according to another embodiment of the present invention, one side 131 and the other side 133 may be formed at various angles with the connecting part 132.

In the state where the sliding door 10 is closed, one side surface of the swing arm 40 coming into contact with the connecting part 132 of the second bracket 130 is formed to be inclined. Therefore, one side 131 of the second bracket 130 obliquely faces the hook receiver 112 of the first bracket 110.

Referring to FIGS. 6A and 6B, the hook 137 is formed on one side 131 of the second bracket 130 to be received in the hook receiver 112 formed on the first bracket 110. The hook 137 includes a horizontal part 135 extending from one side 131 of the second bracket 130, and a vertical part 136 extending vertically from an end of the horizontal part 135. The locking function of the hook 137 occurs at a junction of the horizontal part 135 and the vertical part 136.

The hook 137 according to the embodiment of the present invention is formed to be approximately perpendicular to one side 131 of the second bracket 130. As described above, since one side 131 of the second bracket 130 obliquely faces the hook receiver 112 of the first bracket 110 with the sliding door 10 being closed, the hook 137 formed to be perpendicular to one side 131 of the second bracket 110 is received in the hook receiver 112 while being in an inclined position with respect to the hook receiver 112. The hook 137 received in the hook receiver 112 does not come into contact with a sidewall of the hook receiver 112. Thus, if no load F acts on the sliding door 10, the hook 137 and the hook receiver 112 do not interfere with each other.

Of course, in another embodiment of the present invention, the hook 137 may be received in the hook receiver 112 while being in a perpendicular position with respect to the hook receiver 112. However, in order reduce an interference moving distance between the hook 137 and the hook receiver 112 when the load F is applied, it is preferable that the hook 137 is in the inclined position with respect to the hook receiver 112.

The male part 134 is formed on the other side 133 of the second bracket 130 to be inserted into the female part 124 of the stopper 120. The male part 134 faces the female part 124, and is formed to be inclined downwards at the same angle as the female part 124. While the sliding door 10 is closed, the male part 134 is inserted into the female part 124.

As described above, since the vertical length of the female part 124 is larger than the horizontal length thereof, the male part 134 may move in a vertical direction while the male part 134 being inserted into the female part 124. According to the embodiment of the present invention, the male part 134 is inserted into the lower side of the female part 124 in the state where the sliding door 10 is closed.

A bumper 138 is provided between the male part 134 and the other side 133 of the second bracket 130 to mitigate shocks between the male part 134 and the stopper 120 when the sliding door 10 is closed. The bumper 138 is made of an elastic material to absorb the shocks.

Meanwhile, if the load F is applied with the sliding door 10 being closed, the swing arm 40 rotates about the rotating shaft X, so that the inclinations of the hook 137, the male part 134 and the female part 124 may be set in a tangential direction in the rotation path of the swing arm 40, but various angles may be formed without being limited thereto.

Figure 7:
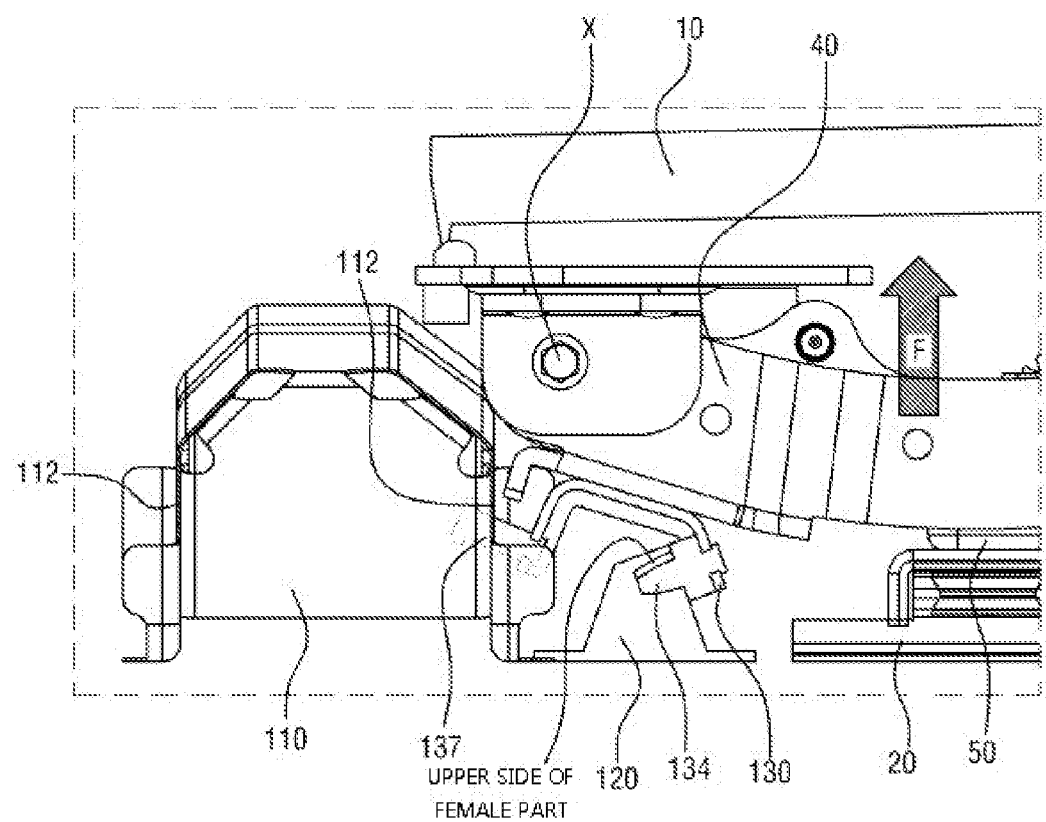
FIG. 7 is a view illustrating a state where the sliding door is closed.
Figure 8:
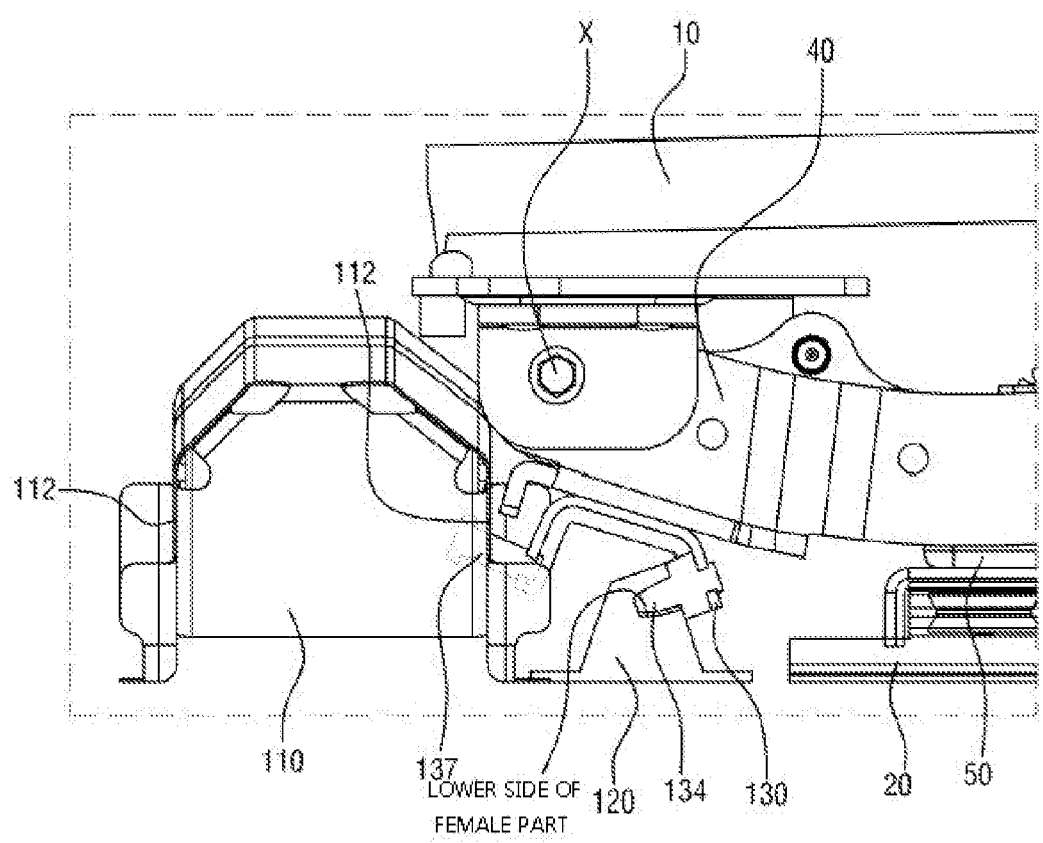
FIG. 8 is a view illustrating a state where a load is applied to the sliding door of FIG. 7.

FIG. 7 is a view illustrating a state where the sliding door is closed, and FIG. 8 is a view illustrating a state where a load is applied to the sliding door of FIG. 7.

Hereinafter, referring to FIGS. 7 and 8, the operation of the structure 100 for improving the separation strength of the opposed sliding door according to the embodiment of the present invention will be described.

First, the structure 100 for improving the separation strength of the opposed sliding door in the state where the sliding door 100 is closed will be described.

Referring to FIG. 7, if force is exerted so that the sliding door 10 moves in a closing direction, the movement of the swing arm 40 connected to the slider 50, namely, the rotary movement about the rotating shaft X and the rectilinear movement through the slider 50 are limited while the male part 134 of the second bracket 130 is inserted into the female part 124 of the stopper 120, and consequently the movement of the sliding door 10 is limited. Such a stopper 120 prevents the sliding door 10 from moving in the longitudinal direction of the vehicle body while the male part 134 is inserted into the female part 124.

Meanwhile, the male part 134 is inserted into the female part 124, and simultaneously the hook 137 of the second bracket 130 is received in the hook receiver 112 of the first bracket 110. At this time, the hook 137 does not come into contact with the sidewall of the hook receiver 112. Thus, while the sliding door 10 is changed between an open state and a closed state, the hook 137 and the hook receiver 112 do not interfere with each other, thus allowing the sliding door 10 to be naturally opened or closed.

Next, the structure 100 for improving the separation strength of the opposed sliding door when the load F is applied in the state where the sliding door 100 is closed will be described.

Referring to FIG. 8, if the load F is applied, the swing arm 40 rotates clockwise and simultaneously moves in a direction from the inside to the outside of the vehicle body P. Then, the second bracket 130 connected to the swing arm 40 moves along the swing arm 40, the male part 134 inserted into the lower side of the female part 124 moves upwards along the second bracket 130, and simultaneously the hook 137 of the second bracket 130 comes into contact with the sidewall of the hook receiver 112 of the first bracket 110. Until reaching this state, the swing arm 40 rotates about the rotating shaft X.

Here, if the load is further applied, the male part 134 inserted into the female part 124 comes into contact with the upper side of the female part 124. Simultaneously, the hook 137 moves to the right while coming into contact with the sidewall of the hook receiver 112 by the rotation of the swing arm 40, and the sidewall of the hook receiver 112 is caught at a point where the horizontal part 135 and the vertical part 136 of the hook 137 meet. In this state, the swing arm 40 no longer rotates, and consequently the sliding door 10 maintains a closed state. Therefore, when the load F is applied in the structure 100 for improving the separation strength of the opposed sliding door according to the embodiment of the present invention, it is possible to more reliably keep the sliding door 10 closed through interference between the male part 134 and the female part 124 and interference between the hook 137 and the hook receiver 112.

While the invention has been shown and described with reference to exemplary embodiments thereof, it will be understood by those skilled in the art that various changes in form and details may be made therein without departing from the spirit and scope of the invention as defined by the appended claims.

What is claimed is:

1. A structure for providing separation strength of an opposed sliding door, the structure comprising:
    a rail configured to be mounted to a vehicle body in a longitudinal direction thereof;
    a first bracket configured to be fixedly connected to the vehicle body at a first side of the rail, the first bracket having a hook receiver;
    a slider inserted into the rail and coupled thereto to be movable in a rolling manner;
    a swing arm configured to be rotatably connected to a sliding door, the swing arm rotatably connected to the slider; and
    a second bracket fixedly connected to the swing arm, the second bracket having on a first side thereof a hook to be received in the hook receiver, wherein the structure is configured so that the hook is received in the hook receiver when a load is applied to the sliding door in a direction from an inside to an outside of the vehicle body with the sliding door being closed.

2. The structure of claim 1, wherein the hook is formed on a first side of the first bracket to be inclined.

3. The structure of claim 1, wherein the hook comprises a horizontal part extending from the second bracket and a vertical part extending vertically from an end of the horizontal part.

4. The structure of claim 1, wherein the structure is configured so that when the load is applied with the hook being received in the hook receiver, a first side of the hook comes into contact with a sidewall of the hook receiver to prevent the swing arm from being rotated.

5. The structure of claim 1, further comprising a stopper fixedly connected to the vehicle body to limit a movement of the swing arm between the rail and the first bracket.

6. The structure of claim 5, wherein an inwardly depressed female part is formed on the stopper and a male part is formed on a second side of the second bracket to be inserted into the female part.

7. The structure of claim 6, wherein the female part is obliquely formed on the second side of the second bracket and the male part is obliquely formed to correspond to the female part.

8. The structure of claim 6, wherein the female part is a slot-shaped groove extending in a vertical direction of the vehicle body.

9. The structure of claim 6, wherein a bumper is provided between the male part and the second side of the second bracket to allow the swing arm to mitigate shocks acting on the stopper.

10. A vehicle comprising:
    a vehicle body;
    a sliding door;
    a rail mounted to the vehicle body in a longitudinal direction thereof;
    a first bracket fixedly connected to the vehicle body at a first side of the rail, the first bracket having a hook receiver;
    a slider inserted into the rail and coupled thereto to be movable in a rolling manner;
    a swing arm rotatably connected to the sliding door, the swing arm rotatably connected to the slider; and
    a second bracket fixedly connected to the swing arm, the second bracket having on a first side thereof a hook to be received in the hook receiver, wherein the vehicle is configured so that the hook is received in the hook receiver when a load is applied to the sliding door in a direction from an inside to an outside of the vehicle body with the sliding door being closed.

11. The vehicle of claim 10, wherein the hook is formed on a first side of the first bracket to be inclined.

12. The vehicle of claim 10, wherein the hook comprises a horizontal part extending from the second bracket and a vertical part extending vertically from an end of the horizontal part.

13. The vehicle of claim 10, wherein the vehicle is configured so that when the load is applied with the hook being received in the hook receiver, a first side of the hook comes into contact with a sidewall of the hook receiver to prevent the swing arm from being rotated.

14. A vehicle comprising:
    a vehicle body;
    a sliding door;
    a rail mounted to the vehicle body in a longitudinal direction thereof;
    a first bracket fixedly connected to the vehicle body at a first side of the rail, the first bracket having a hook receiver;
    a slider inserted into the rail and coupled thereto to be movable in a rolling manner;
    a swing arm rotatably connected to the sliding door, the swing arm rotatably connected to the slider;
    a second bracket fixedly connected to the swing arm, the second bracket having on a first side thereof a hook to be received in the hook receiver, wherein the vehicle is configured so that the hook is received in the hook receiver when a load is applied to the sliding door in a direction from an inside to an outside of the vehicle body with the sliding door being closed; and a stopper fixedly connected to the vehicle body to limit a movement of the swing arm between the rail and the first bracket.

15. The vehicle of claim 14, wherein an inwardly depressed female part is formed on the stopper and a male part is formed on a second side of the second bracket to be inserted into the female part.

16. The vehicle of claim 15, wherein the female part is obliquely formed on the second side of the second bracket and the male part is obliquely formed to correspond to the female part.

17. The vehicle of claim 15, wherein the female part is a slot-shaped groove extending in a vertical direction of the vehicle body.

18. The vehicle of claim 15, wherein a bumper is provided between the male part and the second side of the second bracket to allow the swing arm to mitigate shocks acting on the stopper.

* * * * *